(12) United States Patent
Fox et al.

(10) Patent No.: US 9,291,102 B2
(45) Date of Patent: Mar. 22, 2016

(54) INTERFACE RING FOR GAS TURBINE FUEL NOZZLE ASSEMBLIES

(75) Inventors: Timothy A. Fox, Hamilton (CA); Reinhard Schilp, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 1049 days.

(21) Appl. No.: 13/226,529

(22) Filed: Sep. 7, 2011

(65) Prior Publication Data

US 2013/0055720 A1     Mar. 7, 2013

(51) Int. Cl.
F23R 3/28 (2006.01)
F02C 7/22 (2006.01)
F23R 3/32 (2006.01)

(52) U.S. Cl.
CPC .............. *F02C 7/222* (2013.01); *F23R 3/286* (2013.01); *F23R 3/32* (2013.01)

(58) Field of Classification Search
CPC ............ F23R 3/28; F23R 3/286; F23R 3/283; F23R 3/30; F23R 3/32; F23R 3/34; F23R 3/343; F23R 3/346
USPC ............ 60/737, 738, 739, 740, 746, 747, 748
See application file for complete search history.

(56) References Cited

U.S. PATENT DOCUMENTS

| | | | |
|---|---|---|---|
| 4,356,693 A | 11/1982 | Jeffery et al. | |
| 5,357,745 A * | 10/1994 | Probert | 60/39.37 |
| 5,934,066 A | 8/1999 | Schmid et al. | |
| 6,082,111 A * | 7/2000 | Stokes | 60/737 |
| 6,158,223 A | 12/2000 | Mandai et al. | |
| 6,327,861 B2 | 12/2001 | Sato et al. | |
| 6,634,175 B1 | 10/2003 | Kawata et al. | |
| 6,705,087 B1 * | 3/2004 | Ohri et al. | 60/748 |
| 6,829,897 B2 * | 12/2004 | Moriya et al. | 60/737 |
| 7,121,095 B2 * | 10/2006 | McMasters et al. | 60/746 |
| 7,513,098 B2 * | 4/2009 | Ohri et al. | 60/39.11 |
| 7,581,402 B2 | 9/2009 | Parker | |
| 7,805,943 B2 | 10/2010 | Desaulty et al. | |
| 8,375,726 B2 * | 2/2013 | Wiebe et al. | 60/800 |
| 8,438,853 B2 * | 5/2013 | Green et al. | 60/746 |
| 8,475,121 B1 * | 7/2013 | Liang | 415/173.1 |
| 8,646,275 B2 * | 2/2014 | Rackwitz et al. | 60/749 |
| 2007/0199324 A1 * | 8/2007 | Tanimura et al. | 60/740 |
| 2010/0018210 A1 * | 1/2010 | Fox et al. | 60/746 |
| 2010/0051765 A1 | 3/2010 | Alvarez Hernandez | |
| 2010/0275605 A1 * | 11/2010 | Hase et al. | 60/748 |

FOREIGN PATENT DOCUMENTS

WO    WO 2009007283 A2 *   1/2009   ............... F23R 3/28

* cited by examiner

*Primary Examiner* — Phutthiwat Wongwian
*Assistant Examiner* — Michael B Mantyla (57) ABSTRACT

A gas turbine combustor assembly including a combustor liner and a plurality of fuel nozzle assemblies arranged in an annular array extending within the combustor liner. The fuel nozzle assemblies each include fuel nozzle body integral with a swirler assembly, and the swirler assemblies each include a bellmouth structure to turn air radially inwardly for passage into the swirler assemblies. A radially outer removed portion of each of the bellmouth structures defines a periphery diameter spaced from an inner surface of the combustor liner, and an interface ring is provided extending between the combustor liner and the removed portions of the bellmouth structures at the periphery diameter.

19 Claims, 5 Drawing Sheets

INTERFACE RING FOR GAS TURBINE FUEL NOZZLE ASSEMBLIES

STATEMENT REGARDING FEDERALLY SPONSORED DEVELOPMENT

This invention was made with U.S. Government support under Contract Number DE-FC26-05NT42644 awarded by the U.S. Department of Energy. The U.S. Government has certain rights to this invention.

FIELD OF THE INVENTION

This invention relates in general to gas turbine engines and, more particularly, to structure for providing an air flow into a combustor in a gas turbine engine.

BACKGROUND OF THE INVENTION

In order to reduce the amount of NOx emissions from gas turbines, a low emissions combustion system is used. A low emissions combustion system, such as an ultra low NOx (ULN) system, comprises a combustor with an annular array of swirlers and a central pilot swirler. Fuel is injected from fuel injectors extending within the swirlers which, along with the central pilot swirler, stabilize the combustion flame. The fuel injectors and swirlers of a typical ULN system are formed as an integral structure mounted to a support housing and located inside a separate combustor basket assembly. A bellmouth structure at the entrance of each swirler increases the uniformity of flow of air entering the swirler by reducing pressure loss. To allow the array of swirlers to be assembled into the combustor basket assembly, an outer section of each swirler bellmouth structure is typically removed. The removed outer sections of the swirlers provide a clearance between the annular array of swirlers and an inner diameter of a combustor cover plate to facilitate assembly of the array of swirlers into the combustor assembly.

Removing an outer section of the swirler bellmouth may create a non-uniformity of airflow at the swirler inlet. The non-uniformity of airflow causes a localized deficiency of axial velocity, which translates into a local fuel rich flow within each swirler, with associated potential emissions and flashback concerns.

SUMMARY OF THE INVENTION

In accordance with an aspect of the invention, a gas turbine combustor assembly is provided comprising a combustor liner having an inner diameter, and a plurality of fuel nozzle assemblies arranged in an annular array inside the combustor liner. The fuel nozzle assemblies each comprise a bellmouth structure that at least partially defines a periphery of each of the fuel nozzle assemblies. An interface ring is provided between the combustor liner inner diameter and the plurality of fuel nozzle assemblies, wherein the interface ring includes a surface that is substantially contiguous with at least a portion of each of the bellmouth structures.

In accordance with further aspects of the invention, the combustor assembly further may comprise openings located between adjacent ones of the bellmouth structures, and the interface ring may define an interface ring inner diameter, and an interface ring outer diameter located adjacent to the combustor liner inner diameter. The interface ring may include a plurality of air passages located radially outwardly from the interface ring inner diameter, wherein the air passages are circumferentially aligned with respective ones of the openings.

The plurality of air passages may be configured such that inlet air that flows through the plurality of air passages does not flow through the plurality of fuel nozzle assemblies. The plurality of air passages may comprise generally semicircular cutouts that extend radially outwardly from the interface ring inner diameter.

Each of the bellmouth structures may include a removed portion located adjacent to the surface of the interface ring.

The interface ring may be formed separately from the combustor liner. Further, the interface ring may include an outer diameter that is rigidly affixed to the combustor liner inner diameter. The interface ring may comprise a resilient ring positioned in an interference fit between the combustor liner and the fuel nozzle assemblies. Alternatively, the interface ring and the combustor liner may be integrally formed.

The interface ring may define a convexly curved surface having a radially outer edge at the combustor liner and a radially inner edge at the portions of each of the bellmouth structures.

In accordance with an additional aspect of the invention, a gas turbine combustor assembly is provided comprising a combustor liner having an inner diameter. Additionally, the gas turbine combustor assembly comprises a plurality of fuel nozzle assemblies arranged in an annular array inside the combustor liner, wherein each of the plurality of fuel nozzle assemblies comprises a bellmouth structure that at least partially defines a periphery of each of the plurality of fuel nozzle assemblies. Each bellmouth structure includes a peripheral portion having a removed portion. An interface ring is provided between the combustor liner inner diameter and the plurality of fuel nozzle assemblies, wherein the interface ring includes a surface that is substantially contiguous with at least a portion of each of the bellmouth structures adjacent to the removed portions.

In accordance with still further aspects of the invention, the interface ring may define a convexly curved surface extending from the combustor liner to the removed portions of the bellmouth structures.

Each of the fuel nozzle assemblies may comprise a fuel injector and a swirler assembly.

Each swirler assembly may include one of the bellmouth structures formed as an outwardly curved portion at an entrance to the swirler assembly.

The interface ring radially outer edge may be rigidly affixed to the combustor liner inner diameter.

In accordance with yet another aspect of the invention, a gas turbine combustor assembly is provided comprising a cover plate having a cover plate inner diameter and a combustor basket including a combustor liner supported on an inner side of the cover plate. The combustor liner includes a combustor liner inner diameter. The gas turbine combustor assembly further comprises a support housing supported on an outer side of the cover plate and a plurality of fuel nozzle assemblies mounted to the support housing and extending within the combustor liner. Each fuel nozzle assembly includes a fuel injector and a bellmouth structure. Each bellmouth structure includes a removed portion and the removed portions of the plurality of bellmouth structures define a periphery diameter that is smaller than the cover plate inner diameter. The gas turbine combustor assembly further comprises an interface ring extending between the combustor liner inner diameter and the bellmouth structures. The interface ring includes a surface that is generally contiguous with at least a portion of the bellmouth structures at the removed portions.

In accordance with still further aspects of the invention, the bellmouth structures may comprise swirler assemblies, and each swirler assembly may include a bellmouth portion extending radially outwardly at an entrance to the swirler assembly.

The support housing may comprise a first outer diameter and a second outer diameter, the first outer diameter being larger than the second outer diameter and the second outer diameter being sized to fit within the cover plate inner diameter.

Openings may be located between adjacent ones of the bellmouth structures adjacent to the periphery diameter, and the interface ring may include a plurality of air passages located radially outwardly from an inner diameter of the interface ring, wherein each of the air passages is circumferentially aligned with respective ones of the openings.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
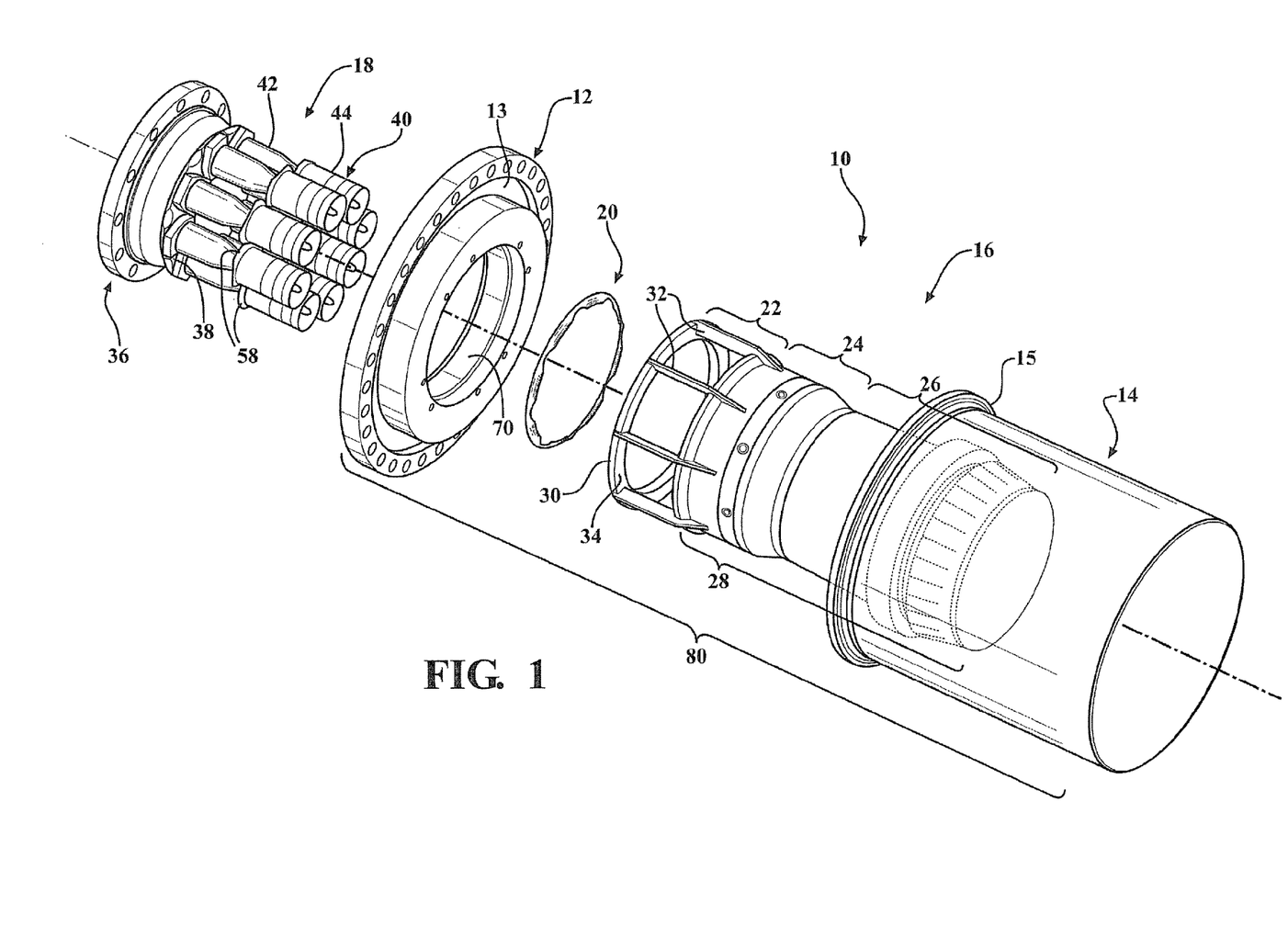
FIG. 1 is an exploded view of a gas turbine combustor assembly according to aspects of the present invention.

Reference is now made to FIG. 1 which shows a gas turbine combustor assembly 10 according to aspects of the present invention. The gas turbine combustor assembly 10 generally includes a cover plate 12, a flow sleeve 14, a combustor basket assembly 16, a support housing assembly 18 and an interface ring 20. The cover plate 12 is substantially disk-shaped and is located between the flow sleeve 14 and the support housing assembly 18. The combustor basket assembly 16 comprises a front basket portion 22, an upstream combustor liner portion 24 and a downstream combustor liner portion 26. Either or both of the upstream combustor liner portion 24 and the downstream combustor liner portion 26 may be generally referred to as the combustor liner 28. The front basket portion 22 includes a combustor basket assembly end ring 30 and axial legs 32 supported on an inner side 34 of the cover plate 12, such as by bolting the combustor basket assembly end ring 30 to an inner side 34 of the cover plate 12. The axial legs 32 extend from a side of the combustor basket assembly end ring 30 that is opposite from the side coupled to the cover plate 12. The axial legs 32 couple the combustor liner 28 to the inner side 34 of the cover plate 12 via the combustor basket assembly end ring 30. As shown in detail in FIG. 2, the flow sleeve 14 includes an upstream end 15 that is coupled to the cover plate 12 at a recess 13 formed in the end of the cover plate 12. The combustor basket assembly 16 is fully surrounded by the flow sleeve 14.

Referring to FIG. 1, the support housing assembly 18 includes a support housing 36 in the shape of a disk that forms the end cap of the combustor assembly 10. An annular array of fuel nozzle assemblies 40 is coupled to an inner side 38 of the support housing 36 and extends in an axial direction away from the support housing 36. Each fuel nozzle assembly 40 comprises an axially-extending fuel nozzle body 42 and a swirler assembly 44. Each fuel nozzle body 42 extends inside the front basket portion 22 to the upstream combustor liner portion 24 of the combustor basket assembly 16, as shown in detail in FIG. 2. Additionally, each swirler assembly 44 is supported on a respective fuel nozzle body 42 adjacent to an end of the fuel nozzle body 42 opposite the cover plate 12. For example, each swirler assembly 44 may be provided integral with a respective fuel nozzle body 42.

Figure 2:
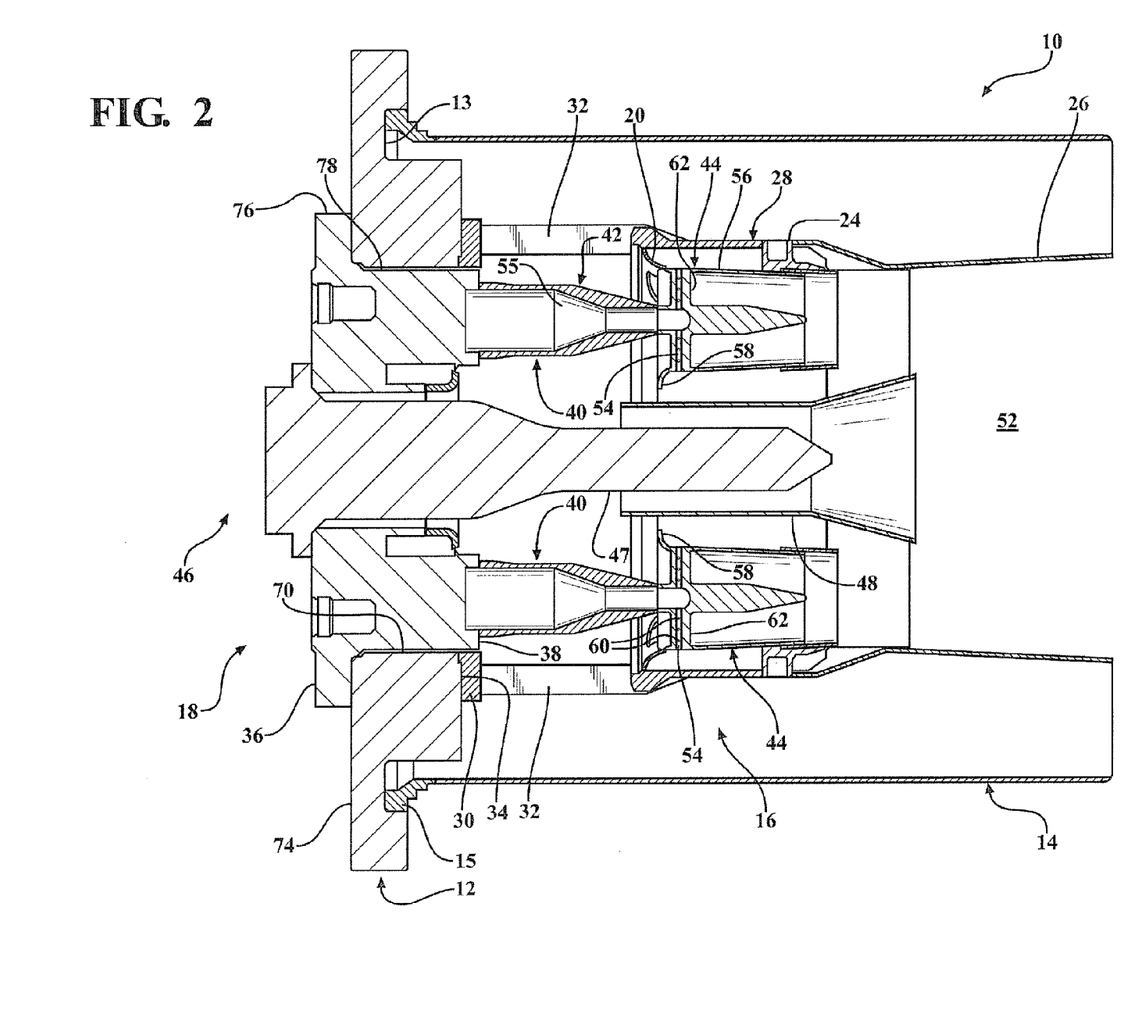
FIG. 2 is an enlarged cross-sectional view of the combustor assembly according to the present invention.

FIG. 2 additionally illustrates a pilot fuel nozzle assembly 46 located at the center of the support housing 36 and extending in an axial direction away from the support housing 36 into the combustor basket assembly 16. The pilot fuel nozzle assembly 46 is located centrally within the annular array of fuel nozzle assemblies 40 and comprises an axially-extending pilot fuel conduit 47 extending through a pilot swirler assembly 48.

Figure 5:
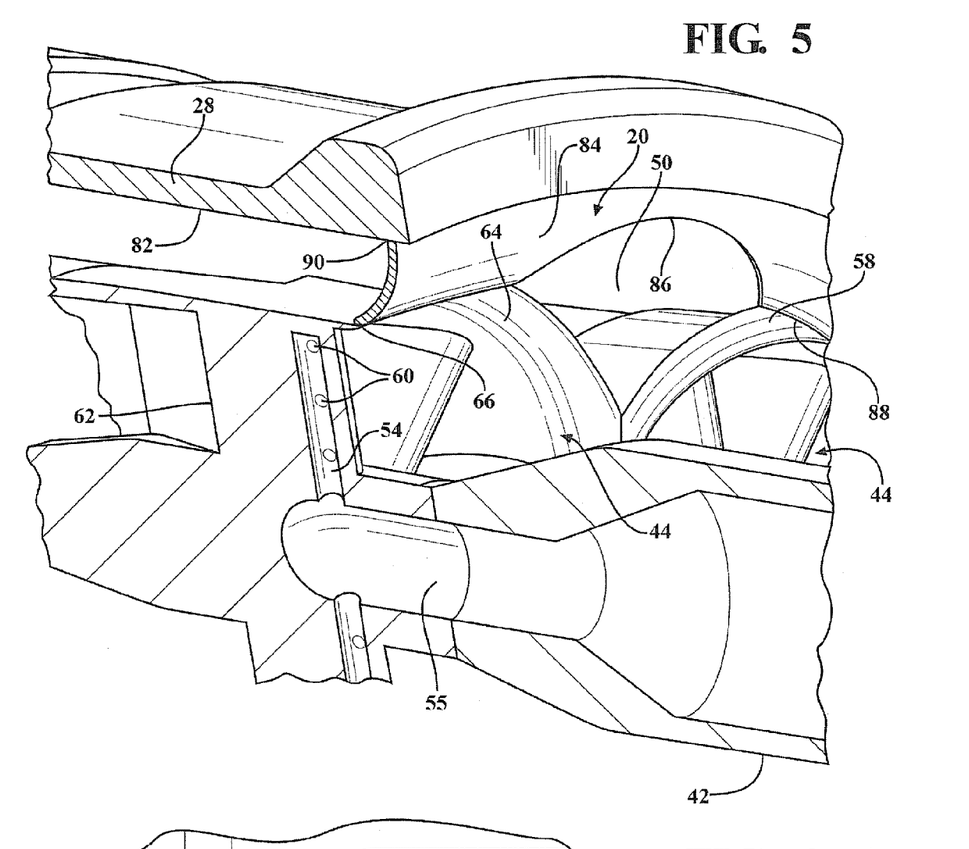
FIG. 5 is a perspective view of an enlarged cross section of the fuel nozzle assemblies and interface ring according to an aspect of the present invention.
Figure 7:
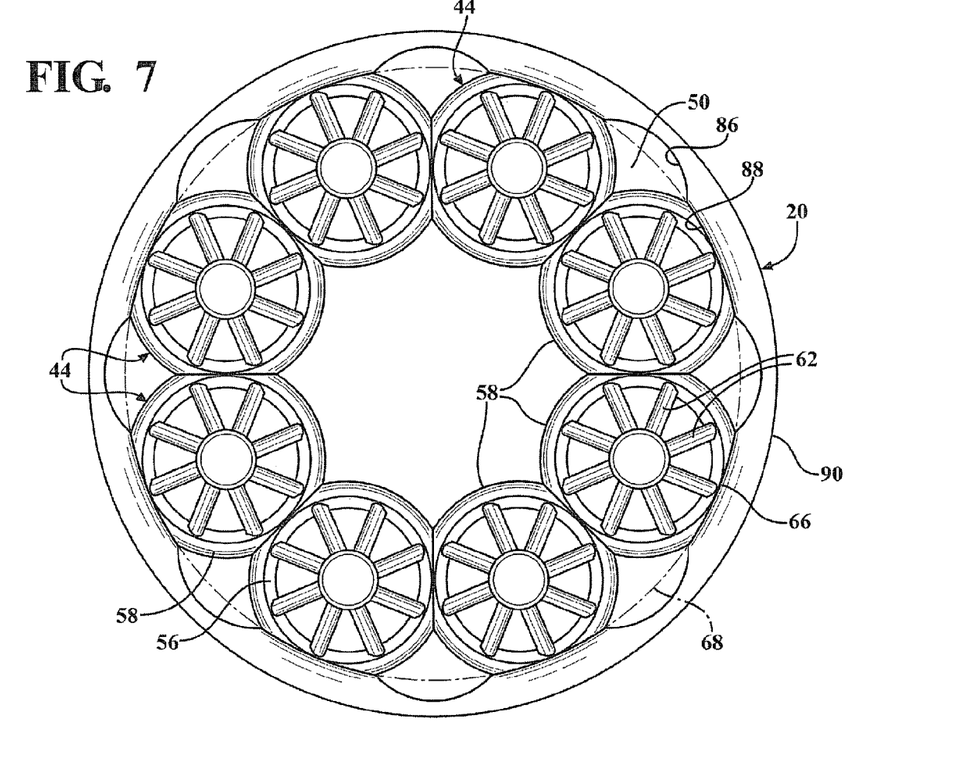
FIG. 7 is an end view illustrating the relative positions of the fuel nozzle assemblies and interface ring in their assembled positions.

During operation, a volume of intake air initially flows in an axial direction between the flow sleeve 14 and the combustor liner 28 toward the cover plate 12. Once the volume of air flows past the upstream combustor liner portion 24, it flows radially inwardly between the axial legs 32 before flowing in an axial downstream direction away from the cover plate 12. A portion of the volume of intake air then flows through the pilot fuel nozzle assembly 46 and the fuel nozzle assemblies 40 to be mixed with fuel, and a further portion of the air may flow through openings 50 between adjacent fuel nozzle assemblies 40, which are shown in FIGS. 5 and 7. The air that flows through the openings 50 between adjacent fuel nozzle assemblies 40 may comprise dilution air, such as for providing dilution at the exit of the swirler assemblies 44. The portion of air mixed with fuel in the fuel nozzle assemblies 40 and the portion of air mixed with fuel in the pilot fuel nozzle assembly 46 are provided to a combustion zone 52, where the fuel/air mixture is combusted to produce a hot working gas.

Figure 3:
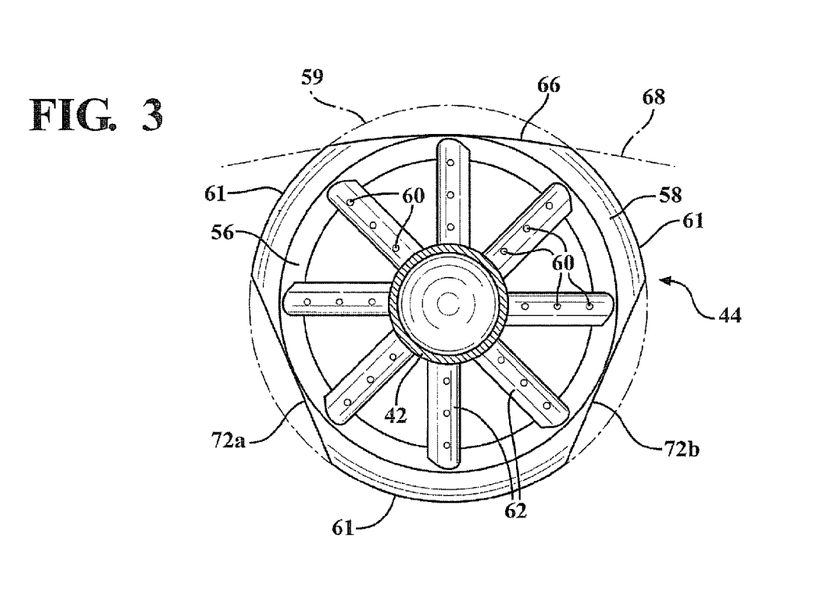
FIG. 3 is an elevational cross-sectional view of a single fuel nozzle assembly for the combustor assembly.

As seen in FIG. 2, each swirler assembly 44 includes a cylindrical main body 56 with a bellmouth structure 58 formed at an upstream end of the main body 56. The bellmouth structure 58 at least partially defines a radially outer periphery of each of the fuel nozzle assemblies 40. As seen in FIG. 3, each swirler 56 includes a plurality of vanes 62 that extend radially inwardly from main body 56 of the swirler assembly 44 to the fuel nozzle body 42 for the fuel nozzle assembly 40. Fuel passages 54 extend from an axial fuel passage 55 within the fuel nozzle body 42 radially outwardly within the vanes 62, and fuel ports 60 may be located on one or more sides of the vanes 62 for injecting fuel into air flowing through the main body 56, as may be further seen in FIGS. 3 and 5. The vanes 62 may comprise airfoil structures oriented at a predetermined angle to promote mixing of air and fuel passing through the fuel nozzle assembly 40 and enhance flame stability in the combustion zone 52.

As discussed above, intake air travels along the outside of the combustor liner 28 before turning inwardly and flowing through the fuel nozzle assemblies 40. As seen in FIG. 2, the bellmouth structures 58 each comprise a contoured surface 64, curved radially outwardly from the main body 56 of the swirler assembly 44 to facilitate directing the airflow into the swirler 56. In particular, each bellmouth structure 58 increases the uniformity of the airflow entering a respective swirler assembly 44 by reducing the pressure loss of the airflow as it enters the swirler assembly 44.

FIG. 7 illustrates the swirler assemblies 44 for the annular array of fuel nozzle assemblies 40, as they are supported on the support housing assembly 18. As may be further seen in FIG. 3, each bellmouth structure 58 includes a pair of inner removed portions 72a, 72b defined at locations where they abut the bellmouth structures 58 of adjacent swirler assemblies 44. The inner removed portions 72a, 72b facilitate closer packaging of the swirler assemblies 44 adjacent to each other. Further, each bellmouth structure 58 includes an outer removed portion 66 defining a location on each bellmouth structure 58 that is closest to the liner 28 when the combustor assembly 10 is assembled. The outer removed portion 66 of each bellmouth structure 58 comprises a substantial elimination of the radial extension of the bellmouth structure 58 at the entrance of each swirler assembly 44. The removed portions 66 of the array of fuel nozzle assemblies 40 define a periphery diameter 68 that is smaller than an inner diameter, i.e., a smallest diameter, of a generally circular cover plate passage 70 defined through the cover plate 12, as seen in FIGS. 1 and 2. It should be noted that for the purposes of this description, "removed portions" refers to the remaining edges of the bellmouth structure 58 extending between those portions of the bellmouth structure 58, i.e., remaining portions 61 of the bellmouth structure 58, lying on a circumference 59 of the bellmouth structure 58.

As may be seen with reference to FIG. 1, the fuel nozzle assemblies 40 are mounted to the support housing 36 prior to assembly of the support housing assembly 18 to the cover plate 12, such that it is necessary for the array of fuel nozzles, and in particular the outermost edges of the swirler assemblies 44, to pass through the cover plate passage 70 during assembly. Hence, the periphery diameter 68 defined by the outer removed portions 66 accommodates passage of the swirler assemblies through the passage 70.

Referring to FIG. 2, the support housing assembly 18 is supported on an outer side 74 of the cover plate 12. The support housing 36 comprises a first outer peripheral surface 76 defining a first outer diameter, and a second outer peripheral surface 78, defining a second outer diameter. The diameter of the first peripheral surface 76 is larger than the diameter of the second peripheral surface 78, and the second peripheral surface 78 is sized smaller than the diameter of the cover plate passage 70, permitting the second peripheral surface 78 to be positioned within the cover plate passage 70, with the portion of the support housing 36 extending between the first and second peripheral surfaces 76, 78 engaging against the outer side 74 of the cover plate 12.

Figure 6:
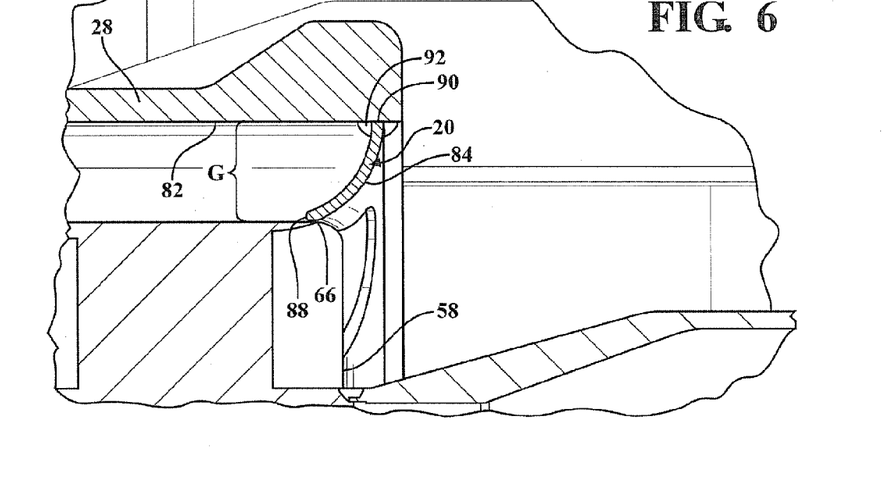
FIG. 6 is a detail cross-sectional view of the fuel nozzle assemblies and interface ring illustrated in FIG. 5.

Typically, during an operation of assembling the combustor assembly 10, the cover plate 12, combustor basket assembly 16 and flow sleeve 14 are initially assembled as a downstream combustor assembly portion 80 (FIG. 1). Subsequently, the support housing assembly 18 is mounted to the cover plate 12 with the fuel nozzle assemblies 40 and pilot fuel nozzle assembly 46 positioned extending within the liner 28. As a result of removing the outer sections of the bellmouth structures 58 to form the outer removed portions 66, there is typically a gap G between an inner surface 82 of the liner 28 and the outer edges of the array of bellmouth structures 58, as seen in FIG. 6. In prior combustor assemblies this gap G may permit airflow past the outer edges of the bellmouth structures 58, with a resulting non-uniformity of air passing into the swirler assemblies 44, and an associated localized low flow velocity for the air passing through the radially outer portion of each of the swirler assemblies 44. The localized low flow velocity may translate into a local rich fuel zone in the flow through each of the swirler assemblies 44, which may increase emissions levels and may increase the potential for flashback.

In accordance with a further aspect of the invention, an interface is provided between the inner surface 82 of the liner 28 and the outer removed portions 66 of the swirler assemblies 44 to provide a turning feature for increasing the airflow directed into the swirler assemblies 44 adjacent to the periphery diameter 68 of the array of fuel nozzle assemblies 40. In particular, a separate element comprising the interface ring 20 may be provided, associated with the downstream combustor assembly 80, to form the turning feature for the airflow, where the interface ring 20 may be assembled to the downstream combustor assembly 80 prior to assembly of the support housing assembly 18 to the downstream combustor assembly 80.

As shown in FIGS. 5 and 6, when the interface ring 20 is positioned between the inner surface 82 of the liner 28 and the swirler assemblies 44, a surface 84 of the interface ring 20 is generally contiguous with at least a portion of the bellmouth structures 58 at the removed portions 66. The interface ring surface 84 defines a contour with a convexly curved profile that may be the same as, or substantially similar to, the curvature of the contoured surface 64 of the bellmouth structures 58. That is, the interface ring surface 84 may curve radially outwardly from an interface ring inner diameter, as defined by an inner edge 88, in a manner similar to the contoured surface 64 of the bellmouth structures 58. Alternatively, the profile of the interface ring surface 84 may be any other profile that bridges between the inner surface 82 of the liner 20 and the swirler assemblies 44 to provide a desired airflow characteristic. The contoured ring surface 84 extends to locations adjacent to the removed portions 66 in order to provide a generally uninterrupted surface with the remaining portions 61 of the bellmouth structures 58 to provide an airflow with a substantially uniform velocity around the circumference of each of the swirler assemblies 44.

Figure 4:
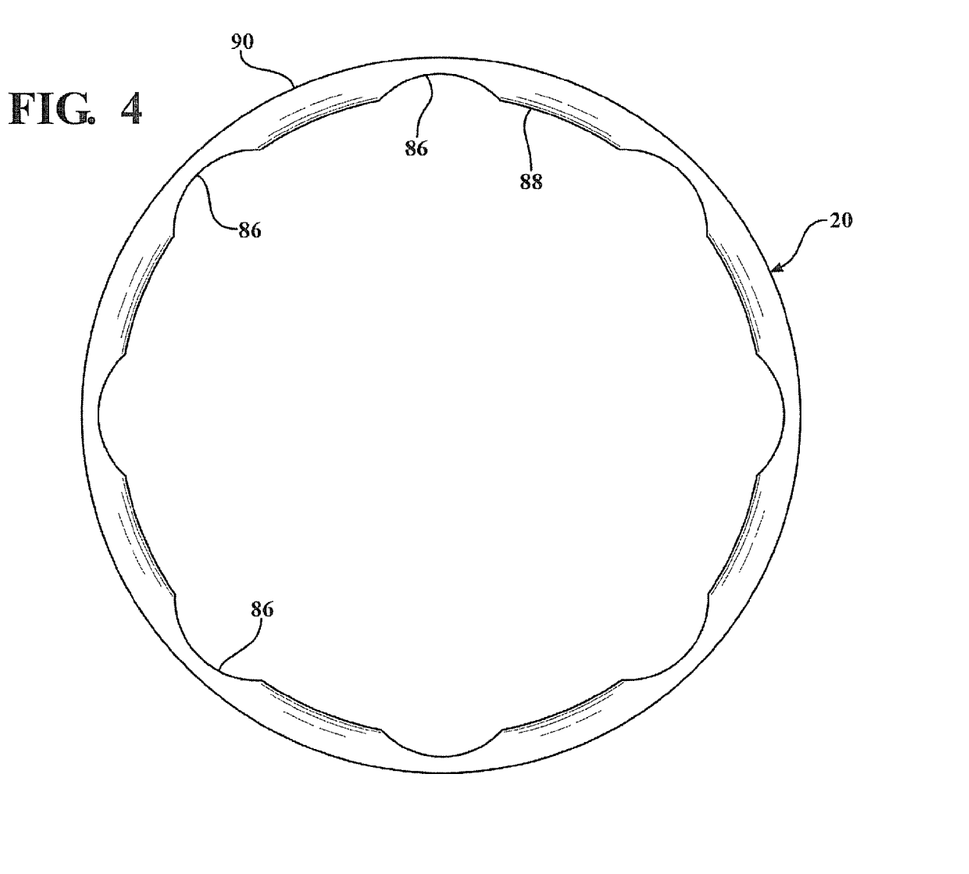
FIG. 4 is an elevational view of an interface ring in accordance with an aspect of the invention.

As noted above with reference to FIGS. 5 and 7, openings 50 are defined between the bellmouth structures 58 of adjacent fuel nozzle assemblies 40 near the periphery diameter 68, permitting passage of a portion of the air to flow between the swirler assemblies 44, such as for cooling of the main bodies 56 of the swirler assemblies 44. In order to accommodate passage of air through the openings 50, the interface ring 20 includes a plurality of air passages, such as may be defined by cutouts 86 extending radially outwardly from the inner diameter at the inner edge 88 of the interface ring 20, as may be further seen in FIG. 4. Each interface ring cutout 86 is circumferentially aligned with an opening 50 between adjacent bellmouth structures 58, as seen in FIG. 7. The cutouts 86 and openings 50 cooperate to allow air to flow between the combustor liner 28 and fuel nozzle assemblies 40 for cooling of locations within the liner 28. The interface ring cutouts 86 are preferably semicircular in shape. Alternatively, the air passages through the interface ring 20 may comprise other shapes for the cutouts 86, or may comprise a plurality of smaller holes or slots (not shown) formed through the surface 84 and circumferentially aligned with the openings 50 in order to allow cooling air to flow past the interface ring 20.

Referring to FIG. 6, an outer diameter of the interface ring 20, such as is defined by an outer edge 90, is preferably rigidly affixed to the inner surface 82 of the combustor liner 28. For example, the outer edge 90 of the interface ring 20 may be affixed to the combustion liner inner surface 82 by a weld connection 92. Alternatively, the interface ring 20 may be integrally formed with the combustor liner 28, such as by casting or by some other construction. With the outer edge 90 affixed to the inner surface 82 of the liner 28, and the fuel nozzle assemblies 40 located within the liner 28, a small gap (not shown) may be provided between the inner diameter of the interface ring 20 and the flattened sector 66 or periphery diameter 68 in order to accommodate tolerance variations between the components, such as may comprise assembly tolerances to facilitate assembly of the components.

While FIGS. 2 and 6 illustrate the interface ring 20 located a small distance from the axial end of the combustor liner 28, the present invention is not limited to a particular location of the interface ring 20 relative to the end of the liner 28. For example, the interface ring 20 may be located directly at the axial end of the combustor liner 28 closest to the cover plate 12. Alternatively, the interface ring 20 may be located a greater distance away from the axial end of the combustor liner 28 than is shown in FIGS. 2 and 6. The particular axial location of the interface ring 20 is preferably determined with reference to the axial location of the swirler assemblies 44 relative to the combustor liner 28 to provide the desired airflow characteristics at the entrance of the swirler assemblies 44.

Figure 8:
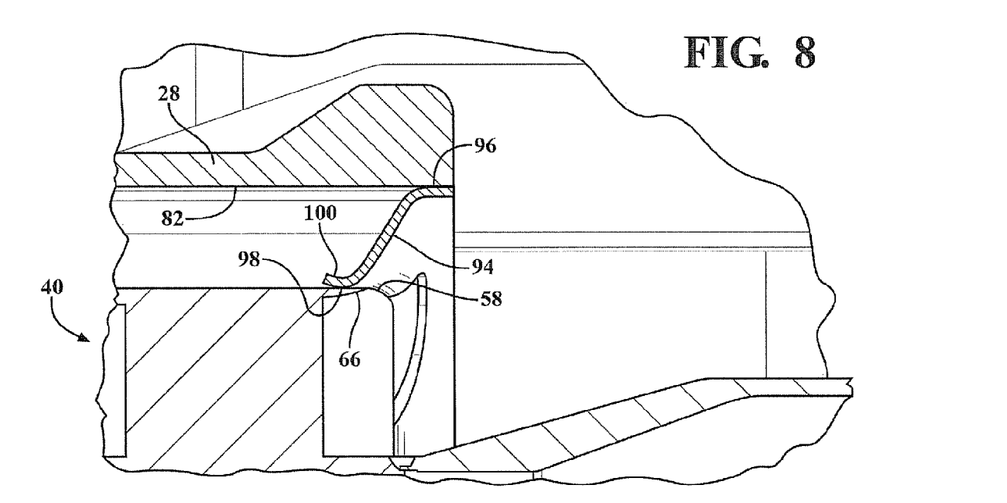
FIG. 8 is a cross-sectional view illustrating an interface ring in accordance with a further aspect of the present invention.

Referring to FIG. 8, an alternative configuration for an air turning element is illustrated by an interface ring 94. The interface ring 94 comprises a resilient ring which may be formed of a suitable material having spring or resilient properties, such as a high temperature heat resistant alloy having resilient properties. The interface ring 94 may be formed with a radial dimension between an outer diameter surface 96 and an inner diameter surface that is greater than the dimension of the gap G between the inner surface 82 of the liner 28 and the removed portions 66 of the swirler assemblies 44, such that the interface ring 94 may be in engagement in an interference fit between the combustor liner 28 and each of the bellmouth structures 58 of the fuel nozzle assemblies 40. For example, the outer diameter surface 96 of the resilient interface ring may be press-fit or similarly coupled by an interference or friction fit to the combustor liner inner diameter 82; and the inner diameter surface 98 of the resilient interface ring 94 may be smaller than the periphery diameter 68, such that the inner diameter surface 98 of the ring 94 engages the bellmouth structures 58 of the swirler assemblies 44 in an interference or friction fit. The interface ring 94 may resiliently flex between the outer and inner diameter surfaces 96, 98 to accommodate movement between the fuel nozzle assemblies 40 and the inner surface 82 of the liner 28.

Additionally, an axial end 100 of the inner diameter surface 98 of the resilient interface ring 94 may be formed with a curvature extending radially outwardly. The axial end 100 is positioned at a downstream location of the swirler assemblies 44, axially spaced from the removed portions 66. The configuration of the axial end 100 facilitates withdrawal of the array of fuel nozzle assemblies 40 without catching an edge of the inner diameter surface 96 on the main bodies 56 of the swirler assemblies 44 during withdrawal of the support structure assembly 18 from the downstream combustor assembly 80.

It should be understood that the interface ring 94 may define a configuration similar to the configuration described for the interface ring 20. In particular, the interface ring 94 may be provided with a curved profile for turning air to flow into the swirler assemblies 44, and may include air passages, such as cutouts (not shown in FIG. 8) for permitting passage of air through the openings 50.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine combustor assembly of a gas turbine comprising:
   a cover plate having a cover plate inner diameter;
   a combustor basket including a combustor liner supported on a downstream side of said cover plate, said combustor liner having a combustor liner inner diameter;
   a plurality of fuel nozzle assemblies arranged in an annular array inside said combustor liner, wherein each of said plurality of fuel nozzle assemblies comprises a fuel injector and a swirler assembly, each swirler assembly including a main body, wherein an upstream end of said main body of each swirler assembly comprises a bellmouth structure formed as a radially outwardly curved portion at an entrance to said swirler assembly, said bellmouth structure being located upstream of said fuel injector and an outer edge of said bellmouth structure at least partially defining a radially outer periphery with reference to a center of said plurality of fuel nozzle assemblies in said annular array, wherein a radially outer portion of said outer edge of each bellmouth structure is removed to define a flattened area; and
   an interface ring provided between said combustor liner inner diameter and said plurality of fuel nozzle assemblies and located axially at said upstream end of said main body of each swirler assembly, wherein said interface ring includes a surface that is substantially contiguous with at least a portion of said flattened area of each of said bellmouth structure, said interface ring comprising a radially inner edge defining an interface ring inner diameter and a radially outer edge defining an interface ring outer diameter;
   wherein said radially outer edge of said interface ring is located adjacent to and contacts said combustor liner inner diameter; and
   wherein each of a plurality of portions of said radially inner edge of said interface ring spans between said at least a portion of said flattened areas of two adjacent ones of said bellmouth structures, an air passage being defined between each of said plurality of portions of said radially inner edge and said flattened areas of said two adjacent ones of said bellmouth structures, wherein each air passage is located circumferentially between two fuel nozzle assemblies of said plurality of fuel nozzle assemblies.

2. The gas turbine combustor assembly as set forth in claim 1, wherein said each air passage is configured such that inlet air that flows through said each air passage does not flow through said plurality of fuel nozzle assemblies.

3. The gas turbine combustor assembly as set forth in claim 1, wherein each of a plurality of portions of said radially inner edge of said interface ring spanning between said at least a portion of said flattened areas of said two adjacent ones of said bellmouth structures further comprises a generally semicircular cutout that extends radially outwardly from said radially inner edge of said interface ring.

4. The gas turbine combustor assembly as set forth in claim 1, wherein said flattened area of each of said bellmouth structures defines a periphery diameter that is smaller than said cover plate inner diameter, and wherein said each of a plurality of portions of said radially inner edge of said interface ring spanning between said at least a portion of said flattened areas of two adjacent ones of said bellmouth structures extends radially inwardly up to said periphery.

5. The gas turbine combustor assembly as set forth in claim 1, wherein said interface ring is formed separately from said combustor liner.

6. The gas turbine combustor assembly as set forth in claim 5, wherein said interface ring outer diameter is rigidly affixed to said combustor liner inner diameter.

7. The gas turbine combustor assembly as set forth in claim 5, wherein said interface ring comprises a resilient ring positioned in an interference fit between said combustor liner and said plurality of fuel nozzle assemblies.

8. The gas turbine combustor assembly as set forth in claim 1, wherein said interface ring and said combustor liner are integrally formed.

9. The gas turbine combustor assembly as set forth in claim 1, wherein said interface ring defines a convexly curved surface having said radially outer edge at said combustor liner and said radially inner edge at said radially outer portion of said outer edge of each bellmouth structure.

10. The gas turbine combustor assembly as set forth in claim 9, wherein said convexly curved surface of said interface ring defines a convexly curved profile that is substantially similar to a curvature defined by said radially outwardly curved portion of each respective said bellmouth structure.

11. A gas turbine combustor assembly comprising:
a cover plate having a cover plate inner diameter;
a combustor basket including a combustor liner supported on a downstream side of said cover plate, said combustor liner having a combustor liner inner diameter;
a support housing supported on an upstream side of said cover plate;
a plurality of fuel nozzle assemblies mounted to said support housing and extending axially within said combustor liner, said plurality of fuel nozzle assemblies being arranged in an annular array inside said combustor liner, wherein each of said plurality of fuel nozzle assemblies comprises a fuel injector and a swirler assembly, each swirler assembly including a main body, wherein an upstream end of said main body for each swirler assembly comprises a bellmouth structure formed as a radially outwardly curved portion at an entrance to said each swirler assembly, each of said bellmouth structures being located upstream of each respective said fuel injector and an outer edge of each said bellmouth structure at least partially defining a radially outer periphery with reference to a center of said plurality of fuel nozzle assemblies in said annular array, wherein a radially outer portion of said outer edge is defined for each said bellmouth structure and is removed to define a flattened area, said plurality of fuel nozzle assemblies being arranged in said annular array inside said combustor liner such that said flattened area of each respective bellmouth structure defines a periphery diameter that is smaller than said cover plate inner diameter, wherein a radially outer edge of said interface ring is located adjacent to and contacts said combustor liner inner diameter; and
an interface ring provided between said combustor liner inner diameter and said plurality of fuel nozzle assemblies and located axially at said upstream end of said each main body for each swirler assembly, wherein said interface ring includes a surface that is substantially contiguous with at least a portion of each of said flattened area of each respective said bellmouth structure, said interface ring comprising a radially inner edge defining an interface ring inner diameter, wherein a portion of said radially inner edge of said interface ring spans between each said flattened area of two of said bellmouth structures, wherein an air passage is defined between said portion of said radially inner edge and each said flattened area of two of said bellmouth structures, wherein each air passage is located circumferentially between two fuel nozzle assemblies of said plurality of fuel nozzle assemblies.

12. The gas turbine combustor assembly as set forth in claim 11, wherein said interface ring defines a convexly curved surface extending from said combustor liner to said flattened area of each respective said bellmouth structure.

13. The gas turbine combustor assembly as set forth in claim 12, wherein said convexly curved surface comprises said radially outer edge of said interface ring at said combustor liner and said radially inner edge at said flattened area of each respective said bellmouth structure.

14. The gas turbine combustor assembly as set forth in claim 13, wherein said radially outer edge of said interface ring is rigidly affixed to said combustor liner inner diameter.

15. The gas turbine combustor assembly as set forth in claim 11, wherein said support housing comprises a first outer diameter and a second outer diameter, said first outer diameter being larger than said second outer diameter, and said second outer diameter being sized to fit within said cover plate inner diameter.

16. The gas turbine combustor assembly as set forth in claim 11, wherein said interface ring is formed separately from said combustor liner and includes an outer diameter that is rigidly affixed to said combustion liner inner diameter.

17. The gas turbine combustor assembly as set forth in claim 11, wherein said combustor liner is supported on said downstream side of said cover plate by a combustor basket assembly end ring, said combustor basket assembly end ring defining an end ring inner diameter that is substantially similar to said cover plate inner diameter.

18. The gas turbine combustor assembly as set forth in claim 11, wherein said portion of said radially inner edge extends radially inwardly up to said periphery diameter.

19. The gas turbine combustor assembly as set forth in claim 11, wherein each of said a portion of said radially inner edge of said interface ring spanning between each said flattened area of two of said bellmouth structures further comprises a generally semicircular cutout that extends radially outwardly from said radially inner edge of said interface ring.

* * * * *